United States Patent

[11] 3,588,673

[72] Inventor Harold R. Ahrens
San Diego, Calif.
[21] Appl. No 725,094
[22] Filed Apr. 29, 1968
[45] Patented June 28, 1971
[73] Assignee Cohu Electronics Inc.
San Diego, Calif.

[54] MULTILEVEL SOLID STATE DC VOLTAGE STANDARD

15 Claims, 4 Drawing Figs.

[52] U.S. Cl. .......... 323/9, 321/18, 323/22, 323/25
[51] Int. Cl. .......... G05f 1/58, G05f 1/64
[50] Field of Search .......... 321/18, 24, 16 (Cursory); 323/9, 22 (T), 25, 38

[56] References Cited

UNITED STATES PATENTS 3,267,350 8/1966 Graham et al. .......... 321/18
3,283,173 11/1966 Marcus .......... 323/22TUX(P)
3,284,692 11/1966 Gautherin .......... 321/16
3,305,763 2/1967 Kupferberg et al. .......... 323/9
3,309,599 3/1967 Broomhall .......... 321/18X
3,366,871 1/1968 Connor .......... 323/9
3,372,326 3/1968 Stefanov .......... 321/18X

*Primary Examiner*—J. D. Miller
*Assistant Examiner*—A. D. Pellinen
*Attorney*—Lyon and Lyon

ABSTRACT: A DC voltage standard for electronically providing very accurate standard voltages at different levels. An operational amplifier having a highly stable reference voltage as an input controls the impedance of a series transistor connected between a voltage supply and the load. The magnitude of the voltage produced by the source is controlled so that the voltage drop across the output transistor does not exceed its capacity. Any error between the stable input voltage and the voltage across the load is applied by a feedback circuit to the input of the amplifier so that the output voltage remains fixed. Circuits are provided for protecting the load against overcurrent, overvoltage and output transistor failure.

INVENTOR.
HAROLD R. AHRENS
BY Lyon & Lyon
ATTORNEYS

INVENTOR.
HAROLD R. AHRENS
BY Lyon & Lyon
ATTORNEYS

INVENTOR.
HAROLD R. AHRENS
BY
Lyon & Lyon
ATTORNEYS

MULTILEVEL SOLID STATE DC VOLTAGE STANDARD

BACKGROUND OF THE INVENTION

It is often necessary to provide a standard voltage against which other voltages can be referred, for example, when instruments are being calibrated or certified or in the design and construction of accurate and stable electronic circuits and precision electronic systems. Such a standard voltage can be provided in several ways, for example, by the use of standard cells which are traceable to the Bureau of Standards volt. The use of standard cells or other classical approaches is awkward and moreover does not give much flexibility or versatility. As a result, electronic voltage standards have been provided which produce an accurate voltage at various levels. Some presently available voltage standards employ an operational amplifier whose input is connected to a very stable reference source to control the voltage drop across a vacuum tube connected between a source of unregulated voltage and the load. The feedback circuit of the amplifier is connected to the output and senses any difference between the output voltage and the input voltage with the result that the output of the amplifier causes the voltage drop across the vacuum tube to be greater or lesser to bring the output voltage to its desired value. In order to provide different levels of output voltage, different values of input or range resistors and feedback resistors are provided which can be switched into the amplifier circuit. Conventionally, an overload protection circuit is provided to prevent the output current from exceeding a predetermined level or to disable the output circuit if the current does exceed a predetermined level.

SUMMARY OF THE INVENTION

According to the present invention, a solid state voltage standard is provided which gives improved accuracy and performance over those previously available. A transistor is used to control the output circuit and a preregulator is provided which limits the voltage in the output circuit to a value which the transistor can effectively drop regardless of the voltage level selected. This eliminates the need to use several transistors in series with the attendant complications of such a connection. The preregulator also results in lower power dissipation at low output voltages and high currents so that the efficiency and reliability of the unit are increased. A circuit is provided for sensing when the current in the output circuit exceeds a predetermined level and actuating a gate to cause the output transistor to convert from a constant voltage mode to a constant current mode. To prevent the output voltage from exceeding a predetermined value, a second amplifier system having a faster recovery time is provided which takes control when the primary amplifier circuit attempts to drive the output voltage above a predetermined value because of a transient situation in the primary control circuit or a failure in that circuit. In the event that the output transistor should fail, a system is provided for limiting the output of the preregulator to a voltage only slightly in excess of that desired so that no damage can be done to the load.

It is therefore an object of the present invention to provide an improved DC voltage standard.

It is another object of the present invention to provide an electrical circuit having overcurrent and/or overvoltage protection.

These and other objects and advantages of the present invention will become more apparent upon reference to the accompanying description and drawings in which:

DESCRIPTION OF THE INVENTION

Figure 1:
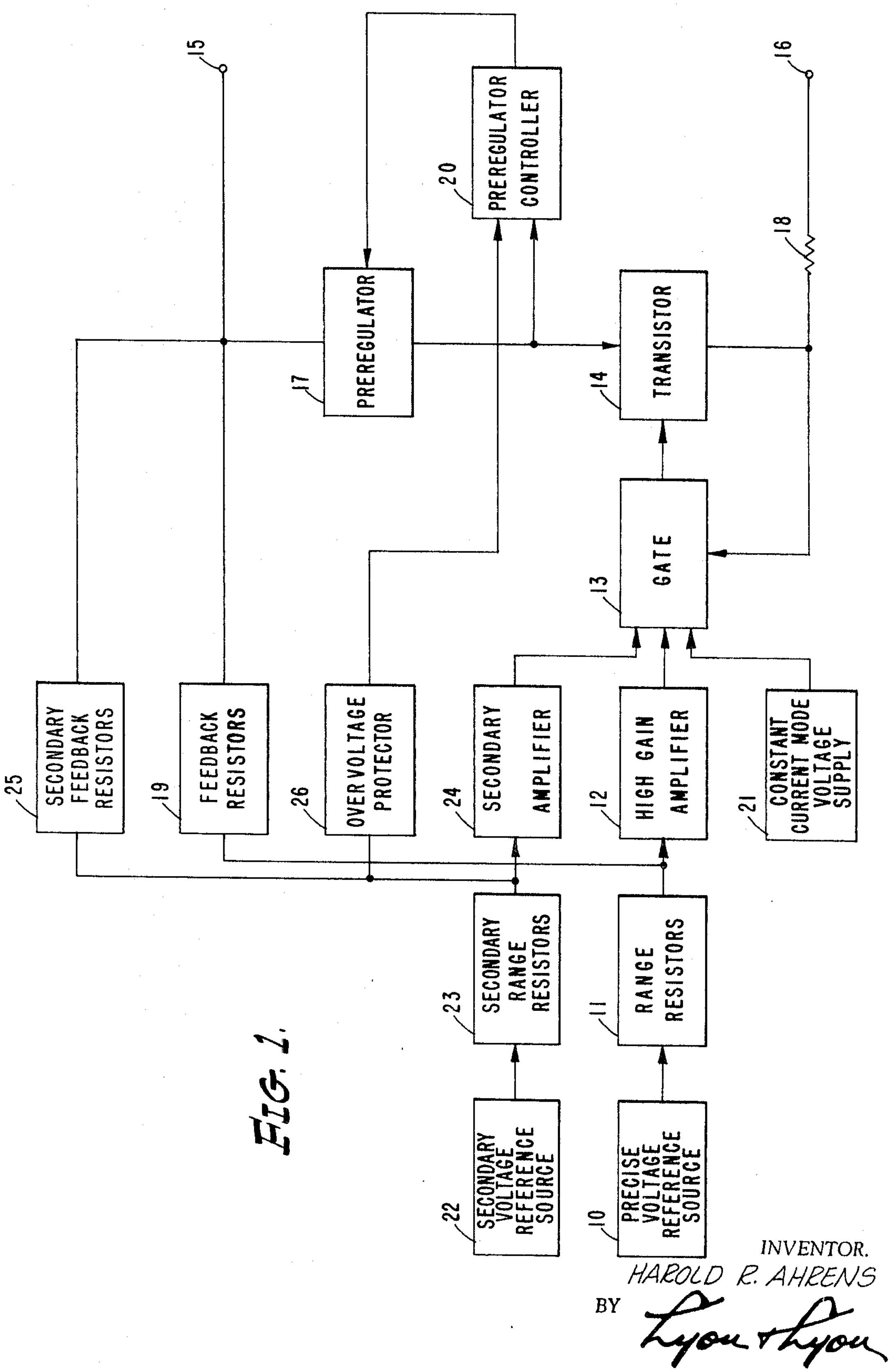
FIG. 1 is a block diagram illustrating the voltage standard of the present invention.

Turning now to FIG. 1, there is shown a block diagram of the voltage standard of the present invention. A precise voltage reference source 10 which may, for example, by a zener diode positioned within a constant temperature oven, has its output connected through range resistors 11 to the input of a high gain amplifier 12. The output of the amplifier 12 is connected to a transistor 14 to vary the conductance of the transistor, or, in other words, to vary its impedance. The transistor 14 is connected in series with a pair of output terminals 15 and 16, a preregulator 17 and a resistor 18. This circuit constitutes the output circuit and the voltage appearing across the terminals 15 and 16 will be the voltage produced by the preregulator 17 less the drop across the transistor 14 and the resistor 18. The latter will be quite small as this resistor has a low value and serves only to sense the current flowing in the output circuit.

The output terminal 15 is connected to the input of the high gain amplifier 12 by a feedback resistors 19. It can thus be seen that the amplifier 12 functions as an operational amplifier whose accuracy depends only upon the precision of the resistors 11 and 19 and the source 10. The resistors 11 and 19 are as high precision as possible and are made variable so that different output levels can be obtained. Thus, the resistance of the range resistor is selected to result in the needed current passing through the feedback resistor 19. For example, if the feedback resistor 19 is selected to be 1,000 kohms, the range resistor would be selected to pass 1 milliampere of current, to result in an output of 1,000 volts. The amplifier operates to generate a voltage across the output terminals 15 and 16 so that the voltage at its input approaches zero. The system thus far described is generally similar to systems previously known in the art with the exceptions that a transistor is used as the voltage dropping device in the output circuit rather than a vacuum tube and the preregulator 17 is used to supply the output voltage instead of a fixed source.

The use of the transistor 14 as the voltage dropping element in the output circuit raises various problems which were not present with a vacuum tube because the maximum voltage that can be dropped across a transistor is limited. However, since the desirable output voltage can range from as much as 1,000 volts to as little as zero volts, it can be seen that if a fixed source of voltage was used in the output circuit, this source would have to put out a voltage larger than the required, that is, over 1,000 volts, and thus to arrive at an output voltage in the 1 volt range, the transistor would have to drop approximately 1,000 volts. To keep the voltage drop across the transistor 14 within the capability of the transistor, the preregulator 17 is provided. The preregulator 17 does not produce a relatively fixed output voltage but rather produces a variable output voltage which is approximately 100 volts higher than the desired output voltage, regardless of the range selected. The preregulator 17 is controlled by a preregulator controller 20 which senses the voltage at the collector of the transistor 14 and varies the output of the preregulator 17 accordingly.

In order to prevent damage to the instrument or to the load as a result of an excessive current, the resistor 18 is included in the output circuit. When a voltage is developed across the resistor 18 which exceeds a desired level, the gate 13 operates to disconnect the output of the high amplifier 12 from the transistor 14 and connect instead the output of a constant current mode reference 21. The reference 21 supplies a voltage to the base of the transistor 14 such that its conductance is controlled to maintain the output current at a constant value.

When the output circuit switches from a constant voltage to a constant current mode, care must be taken that no damage occurs when it is switched back to the constant voltage mode. According to the present invention, this is accomplished by providing a secondary control loop which comprises a secondary voltage reference source 22, secondary range resistors 23, a secondary amplifier 24 and secondary feedback resistors 25. This secondary loop is generally similar to the primary control loop but need not be composed of such precise components. The gain of amplifier 24 is substantially less than that of the amplifier 12, and the amplifier 24 is less complex and directly coupled so that its recovery time is much more rapid than that of amplifier 12. This secondary loop acts to prevent the voltage appearing across the output terminals 15 and 16 from rising above a predetermined maximum level. If the primary control loop tries to develop an output voltage greater than this maximum value, as may be the case when the amplifier 12 has been operating in saturation and has not had sufficient time to recover, the gate 13 operates to disconnect the output of the amplifier 12 from the base of the transistor 14 and connect the output of the amplifier 24 to the base of the transistor 14. The primary and secondary range resistors 11 and 23 and primary and secondary feedback resistors 19 and 25 are ganged together so that both of the control loops are operating at the same voltage range. The output of the secondary amplifier 24 continues to control the transistor 14 until the primary loop is again capable of resuming control.

In the event of a failure of the transistor 14 so that the output voltage begins to rise above the desired maximum, an overvoltage protector 26 is provided. The overvoltage protector 26 senses this rising output voltage in the secondary feedback path and produces a signal which is applied to the preregulator controller 20 causing the preregulator controller 20 to reduce the output of the preregulator 17 to a value not much greater than the desired output voltage. Thus, if the output circuit was operating in the 100-volt range, the preregulator 17 would normally be producing a voltage on the order of 200 volts. Upon failure of the transistor 14 such that a short circuit would develop, the output across the terminals 15 and 16 would rise toward the full output capability of the preregulator 17. However, the overvoltage protector 26 causes the preregulator controller 20 to reduce the output of the preregulator 17 to approximately 100 volts so that no damage is done to the load.

Figure 2A:
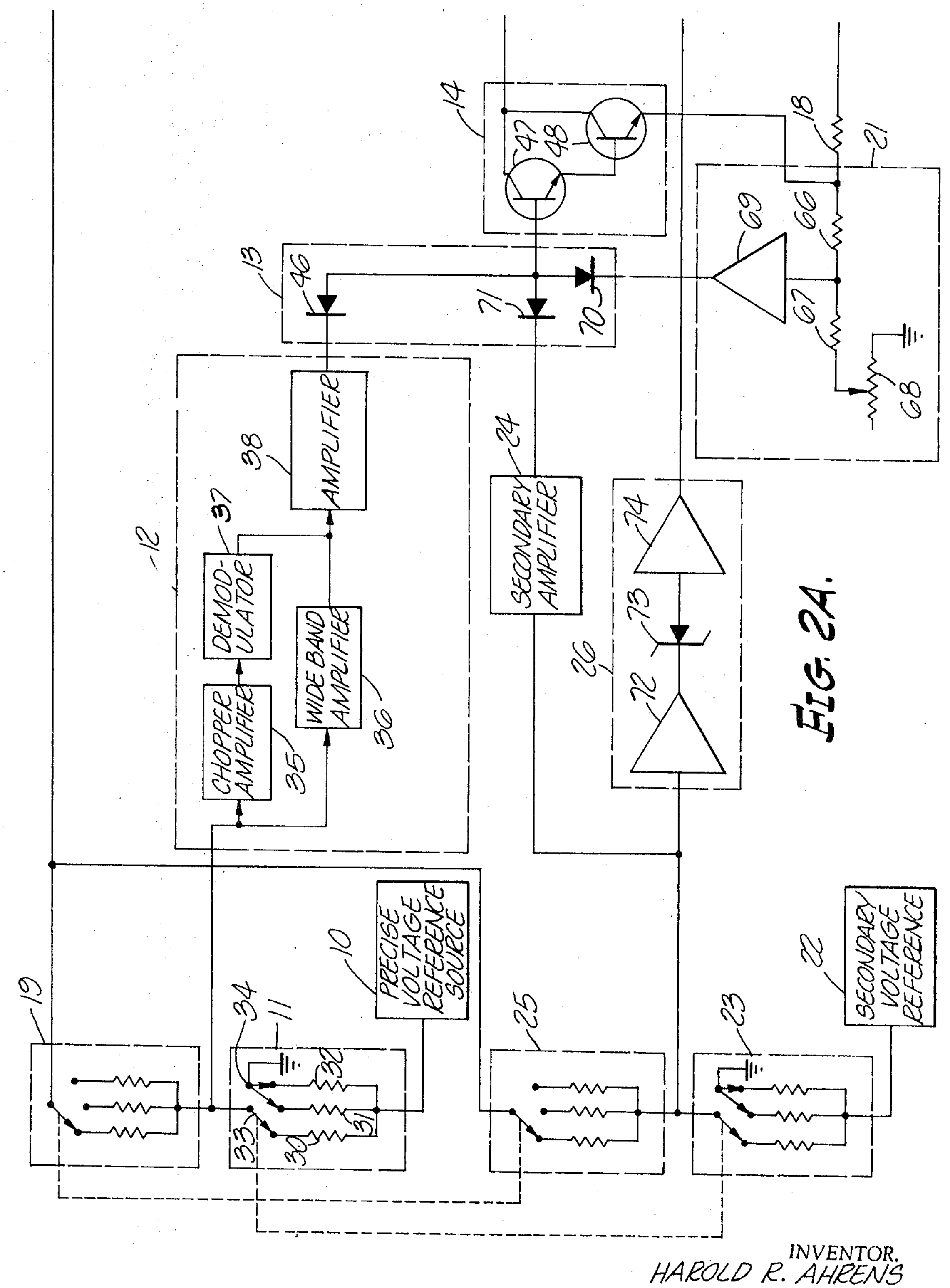
FIGS. 2A and 2B, when taken together as shown in FIG. 2C, constitute a schematic diagram showing the voltage standard of the present invention.
Figure 2C:
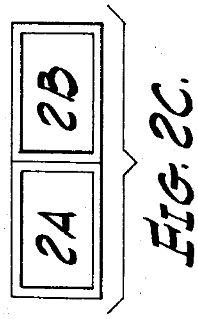
Figure 2B:
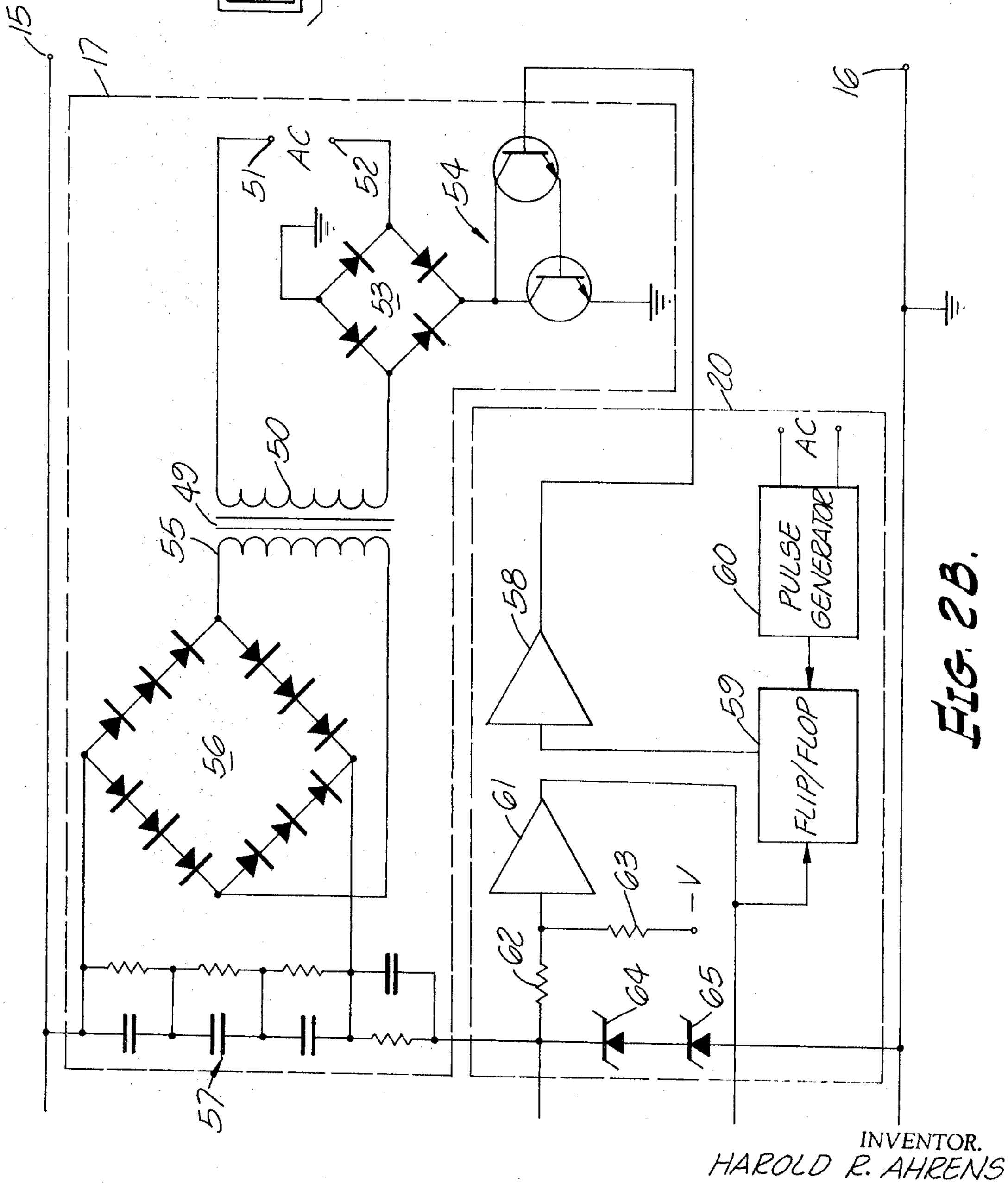

The details of the circuit shown in FIG. 1 are illustrated in FIGS. 2A and 2B. As schematically shown, the range resistors 11 comprise three resistors 30, 31 and 32, the desired resistance being selected by a switch 33. In actual practice, these resistors would be made variable so that any desired output voltage could be selected. A second switch 34 is provided to connect the two unselected resistors to ground so that the load on the source 10 remains constant regardless of which resistor is selected. The high gain amplifier 12 includes a chipper amplifier 35, a wide band amplifier 36, a demodulator 37 and an amplifier 38. The high frequency components of the input are passed by the wide band amplifier 36. The DC component of the input is amplified by chopper amplifier 35 and demodulated by demodulator 37. The amplifier 38 sums the outputs of the chopper amplifier 35 and wide band amplifier 36, amplifies the sum, and produces an output signal which is applied through a diode 46 which makes up part of the gate 13 to the base of a first transistor 47 which is connected to control the output transistor 48.

Power is supplied to the output transistor 48 by the preregulator 17. The preregulator 17 comprises a transformer 49 whose primary winding 50 is connected to AC voltage supply terminals 51 and 52 through a rectifier bridge 53. The alternate terminals of the rectifier bridge 53 are connected to ground through a transistor switch 54. As can be seen, when the switch 54 is closed, that is, conducting, current can flow through the primary winding of the transformer 49 so that a voltage is induced in the secondary winding 55 of the transformer 49. This voltage is rectified by a rectifier bridge 56 and applied to a filter circuit 57 which filters out the AC components and stores the output voltage of the preregulator 17. As can be seen, the time per AC cycle the switch 54 is closed determines the effective DC output of the preregulator 17.

The switch 54 is controlled by the voltage appearing at the collector of the transistor 48 in the following manner. The control signal to the switch 54 in initially provided by an amplifier 58 which is connected to the output of a flip-flop 59 which is set by the output of a pulse generator 60. The pulse generator 60 is connected to the AC supply and produces an output pulse when the input AC crosses the zero axis in either direction. The flip-flop 59 remains set and is not reset by the pulse generator 60. The flip-flop 59, however, is reset by the output of an amplifier 61 which is connected to the collector of the transistor 48 by a resistor 62. The input of the amplifier 61 is also connected to a negative voltage supply by a resistor 63 which serves as a reference voltage. The collector voltage of transistor 48 is compared with the reference voltage by the resistors 62 and 63. The amplifier 61 attempts to minimize any difference by action of the feedback loop comprising the flip-flop 59, the amplifier 58 and the preregulator 17. Zener diodes 64 and 65 are provided for protection when a large reduction in output voltage is called for or in the event the feedback loop fails and the voltage at the collector of transistor 48 gets too high.

The output current is sensed as a voltage drop across the resistor 18 which voltage is reflected across a voltage divider made up of resistors 66 and 67 and potentiometer 68. The voltage at the junction of the resistors 66 and 67 is amplified by an amplifier 69 and applied to a diode 70 which makes up a part of the gate 13. When the voltage across the resistor 18 reaches a predetermined level, as established by the setting of the wiper of the potentiometer 68, the output of the amplifier 69 will be sufficient to cause the diode 70 to conduct and to cause the diode 46 to be back biased with the result that the transistors 47 and 48 will now be controlled by the output of the amplifier 69 and not by the output of the amplifier 12. This will result in a constant current being maintained in the output circuit.

As pointed out previously, when the output circuit has been switched from the constant voltage to the constant current mode, there is a danger when it switches back that the primary control loop will try to develop too great an output voltage. If this occurs, the output of the amplifier 12 will become greater than the output of the amplifier 24 and the diode 71, which is part of the gate 13 and connects the base of the transistor 47 to the amplifier 24, will become conductive and the diode 46 will be back biased with the result that the secondary control loop will take over control of the output circuit and maintain it at a relatively constant voltage until the output of the amplifier 12 reduces sufficiently to regain control of the circuit. The secondary range resistors 23 and secondary feedback resistors 25 are similar to the range resistors and feedback resistors 11 and 19 although they need not be of such precision. In addition, the secondary voltage reference 22 and the resistors 23 and 25 provide a bleed circuit which assures discharge of the capacitors of the filter 57 when a reduction of output voltage is called for.

In the event the output transistors 47 and 48 should fail, the output voltage will begin to rise rapidly. The secondary control loop will attempt to take control but since the transistor 48 is ineffective to drop the voltage, the potential at the input of the amplifier 24 will increase. The input of the amplifier 24 is connected to the overvoltage protector 26 which comprises an amplifier 72, a zener diode 73 and another amplifier 74. When the voltage at the input of the amplifier 24 reaches a predetermined level, the zener diode 73 breaks down and begins to conduct. The current flowing through the zener diode 73 is amplified by the amplifier 74 and applied to the flip-flop 59 causing it to be reset. This resetting of the flip-flop 59 will continue until the output voltage of the preregulator 17 is reduced to a value not significantly in excess of the desired output voltage and held at this value so that no damage can be done to the load.

The invention may be embodied in other specific forms not departing from the spirit or central characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim is:

1. An electrical circuit comprising:
a source of voltage;
an output;
variable impedance means coupling said source of voltage to said output;
first amplifier means coupled to said variable impedance means for varying the impedance thereof in response to the output signal of said first amplifier means;
first means coupled to said output and to said first amplifier means for controlling the output signal thereof whereby the impedance of said variable impedance means is a function of the voltage at said output;
second amplifier means having a recovery time faster than said first amplifier means adapted to be coupled to said variable impedance means for varying the impedance thereof in response to the output signal of said second amplifier means;
second means coupled to said output and to said second amplifier means for controlling the output thereof whereby the impedance of said variable impedance means is a function of the voltage at said output; and
means for decoupling said first amplifier means from said variable impedance means and coupling said second amplifier thereto when the voltage at said output exceeds a desired level.

2. The circuit of claim 1 further comprising:
a source of constant voltage and resistance means coupling said source of constant voltage to the input of said first amplifying means and wherein said first means comprise a feedback resistor.

3. The circuit of claim 2 further comprising:
a second source of constant voltage and second resistance means coupling said second source of constant voltage to the input of said second amplifying means and wherein said second means comprises a second feedback resistor.

4. An electrical circuit comprising:
a source of voltage;
means for controlling the magnitude of the voltage produced by said source;
a pair of output terminals;
variable impedance means;
means coupling said source of voltage and said variable impedance means to said output terminals;
means coupled to said variable impedance means to control the impedance thereof whereby a constant voltage is produced across said output terminals;
means coupled to said voltage magnitude controlling means for limiting the voltage drop across said variable impedance means; and
means coupled to said voltage magnitude controlling means for limiting the magnitude of the voltage appearing across said output terminals in the event of failure of said variable impedance means.

5. An electrical circuit comprising:
a source of voltage;
means for controlling the magnitude of the voltage produced by said source;
a pair of output terminals;
variable impedance means;
means coupling said source of voltage and said variable impedance means to said output terminals;
means coupled to said variable impedance means to control the impedance thereof whereby a constant voltage is produced across said output terminals;
means coupled to said variable impedance means and to said voltage magnitude controlling means for limiting the voltage drop across said variable impedance means;
means coupled to said voltage magnitude controlling means for limiting the magnitude of the voltage appearing across said output terminals in the event of failure of said variable impedance means.

6. A voltage standard comprising:
a source of voltage;
means for controlling the magnitude of the voltage produced by said source;
a pair of output terminals;
variable impedance means;
means coupling said source of voltage and said variable impedance means to said output terminals;
means coupled to said variable impedance means to control the impedance thereof whereby a constant voltage is produced across said output terminals;
means coupled to said variable impedance means and to said voltage magnitude controlling means for limiting the voltage drop across said variable impedance means;
current sensing means coupled to said variable impedance means for changing the output of said variable impedance means from a constant voltage to a constant current when the magnitude of the current exceeds a predetermined magnitude;
first means coupled to said variable impedance means for limiting the magnitude of the voltage appearing across said output terminals; and
second means coupled to said voltage magnitude controlling means for limiting the magnitude of the voltage appearing across said output terminals in the event of failure of said variable impedance means.

7. The voltage standard of claim 6 wherein said means coupled to said variable impedance means to produce a constant voltage comprises an operational amplifier coupled to a precise reference voltage source, said means coupled to variable impedance means for limiting the magnitude of said voltage comprises a second operational amplifier having a recovery time faster than said first operational amplifier coupled to a second reference voltage source and wherein means are provided for coupling said second amplifier to said variable impedance means upon action by said first amplifier to raise the voltage across said output terminals above a predetermined level.

8. The voltage standard of claim 6 wherein said source of voltage comprises a transformer having primary and secondary windings and rectifier and filter means coupled to said secondary winding; and wherein said voltage magnitude controlling means comprises rectifying means coupled to said primary winding and switch means coupled to said rectifying means and operable to permit or prevent current flow therethrough.

9. The voltage standard of claim 8 wherein said means for limiting the voltage drop across said variable impedance means comprises means for sensing the voltage applied to said impedance means and operating said switch means to prevent current flow therethrough when said voltage exceeds a predetermined level.

10. The voltage standard of claim 9 wherein said means for limiting the voltage drop across said variable impedance means comprises a flip-flop coupled to said switch means, a pulse generator coupled to said flip-flop to produce an output therefrom for operating said switch means to permit current flow therethrough, and wherein said sensing means causes said flip-flop to terminate said output.

11. The voltage standard of claim 10 wherein said second means for limiting the magnitude of the voltage appearing across said output terminals includes a zener diode which conducts when the output voltage exceeds a predetermined level and causes said flip-flop to terminate said output.

12. A DC voltage standard for providing standard voltages at different selected levels comprising:
an output;
a regulating transistor coupled to said output to maintain a selected constant voltage level across said output;
a preregulator coupled to said transistor to provide a voltage source, said transistor being controlled to have a voltage drop thereacross equal to the difference between said voltage from said preregulator and said selected constant voltage level;

a first feedback circuit coupled to said output and said transistor to control said transistor;

a preregulator controller coupled to said preregulator and responsive to the voltage drop across said transistor to maintain said voltage from said preregulator at a magnitude less than the difference between the selected voltage level and the maximum voltage which said transistor is capable of dropping;

an overvoltage protector coupled to said output and to said preregulator controller for limiting the voltage from said preregulator to a predetermined value in the event of failure of said transistor.

13. A DC voltage standard for providing standard voltages at different selected levels comprising:

an output;

a regulating transistor coupled to said output to maintain a selected constant voltage level across said output;

a preregulator coupled to said transistor to provide a voltage source, said transistor being controlled to have a voltage drop thereacross equal to the difference between said voltage from said preregulator and said selected constant voltage level;

a first feedback circuit coupled to said output and said transistor to control said transistor;

a preregulator controller coupled to said preregulator and responsive to the voltage drop across said transistor to maintain said voltage from said preregulator at a magnitude less than the difference between the selected voltage level and the maximum voltage which said transistor is capable of dropping; and a second feedback circuit coupled to said output and said transistor to control said transistor, said second feedback circuit having a faster recovery time than said first feedback circuit; and a gate to disconnect said first feedback circuit from said transistor and connect said second feedback circuit thereto if said first feedback circuit causes a voltage level to be developed at said output which exceeds a predetermined value.

14. The voltage standard of claim 13 wherein said first and second feedback circuits include resistors variable to establish said different voltage levels.

15. The voltage standard of claim 13 further comprising a constant current mode voltage supply, and current sensitive means coupled to said output and to said gate to cause said gate to disconnect both said feedback circuits and connect said constant current mode voltage supply to said transistor when the current through said current sensitive means exceeds a predetermined level.